Aug. 18, 1936.                L. DREYFUS                2,051,773
MEANS FOR OPERATING HIGH FREQUENCY INDUCTION FURNACES
Filed Aug. 26, 1933
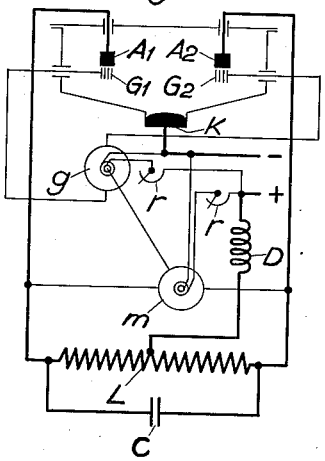
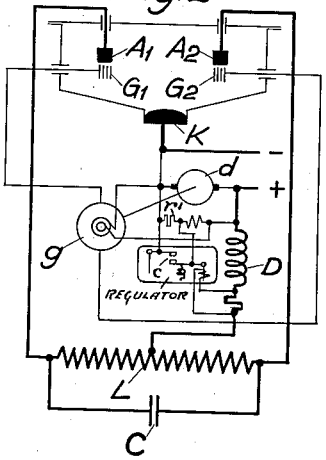
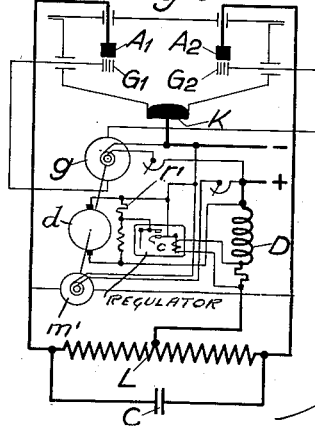
Inventor.
Ludwig Dreyfus,
per
Wm Wallace White.
Attorney.

Patented Aug. 18, 1936

2,051,773

UNITED STATES PATENT OFFICE 2,051,773

MEANS FOR OPERATING HIGH FREQUENCY INDUCTION FURNACES

Ludwig Dreyfus, Vasteras, Sweden, assignor to Allmanna Svenska Elektriska Aktiebolaget, Vasteras, Sweden Application August 26, 1933, Serial No. 686,931
In Sweden June 9, 1932

5 Claims. (Cl. 250—36)

It has been previously proposed to generate high frequency currents, for instance for the purpose of feeding high frequency induction furnaces, by a combination of a grid controlled ion valve apparatus and a resonance circuit, the main inductance of said resonance circuit forming in the same time the inducing winding of the furnace. For effecting the grid control voltage, various connections have been proposed for deriving it from the main alternating current circuit by means of some combination of reactance, resistance, and capacitance for obtaining the desired phase angle of the grid voltage.

According to the present invention, the grid control voltage for an apparatus of the kind specified is obtained from a rotating high frequency generator. This generator can be driven either from the high frequency system by means of a synchronous motor, in which case the phase angle between the two machines should be capable of control, either by feeding the D. C. field of either or both machines by two different windings forming electrically an angle with each other, or by mechanically rotating the stator of one or both of the machines. It is also possible to drive the generator by means of a D. C. motor the speed of which is regulated for instance by a high-speed regulator under the influence of some electrical factor measured at the furnace, as the power or voltage. Finally, a combination of a D. C. motor and a small synchronous motor may be used for driving the high-frequency generator, the synchronous motor then acting to determine the phase angle between the control grid voltage and the main voltage of the resonance circuit.

Three different forms of the invention are diagrammatically illustrated in the accompanying drawing in Figs. 1–3.

In all the figures, $A_1$ $A_2$ represent the anodes of an ion valve having a common cathode K, for instance of mercury, and $G_1$ $G_2$ are the corresponding control grids of the anodes. The latter are connected to the terminals of the furnace winding L and of a condenser battery C, said winding and battery forming together a resonance circuit. A direct current is introduced at + over a smoothing coil at the midpoint of the furnace winding L and leaves the cathode through the conductor —.

The arrangement as thus described is substantially known and acts to generate a high frequency current in the resonance circuit if a suitable alternating voltage is impressed on the grids $G_1$ $G_2$. In order to generate this voltage, a rotating high frequency generator is used according to the present invention.

This generator is in all the figures designated by $g$. In Fig. 1, it is driven by a synchronous motor $m$ connected on the alternating current side to the terminals of the resonance circuit. The field sliprings of both machines are connected to the D. C. supply over regulating rheostats $r$.

In Fig. 2, the generator $g$ is driven by a D. C. motor $d$ connected to the D. C. mains. The field circuit of said motor contains a resistance $r_1$ in parallel with the contacts $c$ of a high-speed regulator which may be acted upon by some electrical factor of the main circuit.

In Fig. 3, the main driving motor of the generator is a D. C. motor $d$ connected as in Fig. 2. On the same shaft, there is an auxiliary synchronous motor $m_1$ connected as the motor $m$ in Fig. 1. The D. C. motor will substantially determine the frequency of the grid voltage and thus of the main circuit, while the synchronous motor will influence the phase of the grid voltage.

I claim as my invention:—

1. Means for operating high frequency induction furnaces, comprising a source of current, a resonance circuit, an ion valve having a cathode, a plurality of anodes, and a control grid operatively associated with each anode, means connecting said anodes to opposite points on said resonance circuit, means connecting said source to said cathode and to an intermediate point on said resonance circuit, a high frequency generator connected to the grids of said valve, and means to drive said generator at a speed controlled by the electrical factors of the resonance circuit.

2. Means for operating high frequency induction furnaces, comprising a source of current having terminals, a resonance circuit, one terminal of said source being connected to an intermediate point of said resonance circuit, and means for connecting the other terminal of said source alternately to opposite points of said resonance circuit comprising a high frequency generator and a motor connected to said generator to drive the same, and means to drive said motor at a speed controlled by the electrical factors of the resonance circuit.

3. Means for operating high frequency induction furnaces, comprising a source of current, a resonance circuit, and means for connecting said source of current alternately to different portions of said resonance circuit, said last means comprising an ion valve having a cathode, one terminal of the source being connected to the cathode, a plurality of anodes connected respectively to said portions of the resonance circuit, the other terminal of the source being connected to an intermediate point on said resonance circuit, and a control grid operatively associated with each anode, a high frequency generator connected to the grids of the valve, and means to drive said generator at a speed controlled by the electrical factors of the resonance circuit.

4. Means for operating high frequency induction furnaces, comprising a source of current, a resonance circuit, and means for connecting said source of current alternately to different portions of said resonance circuit, said last means comprising an ion valve having a cathode, one terminal of the source being connected to the cathode, a plurality of anodes connected respectively to said portions of the resonance circuit, the other terminal of the source being connected to an intermediate point on said resonance circuit, and a control grid operatively associated with each anode, a high frequency generator connected to the grids of the valve, a direct current motor connected to said generator to drive the same, and means to drive said motor at a speed controlled by the electrical factors of the resonance circuit.

5. Means for operating high frequency induction furnaces, comprising a source of current, a resonance circuit, and means for connecting said source of current alternately to different portions of said resonance circuit, said last means comprising an ion valve having a cathode, one terminal of the source being connected to the cathode, a plurality of anodes connected respectively to said portions of the resonance circuit, the other terminal of the source being connected to an intermediate point on said resonance circuit, and a control grid operatively associated with each anode, a high frequency generator connected to the grids of the valve, a synchronous motor connected to said generator to drive the same, and means to supply current to said motor from said resonance circuit.

LUDWIG DREYFUS.